United States Patent [19]
Fogelberg et al.

[11] B 3,920,433
[45] Nov. 18, 1975

[54] APPARATUS AND METHOD FOR IMPROVED GLASSWARE COATING

[75] Inventors: Clement V. Fogelberg; John M. Kujave, both of Arvada, Colo.

[73] Assignee: Columbine Glass Company, Wheatridge, Colo.

[22] Filed: June 25, 1973

[21] Appl. No.: 373,326

[44] Published under the Trial Voluntary Protest Program on January 28, 1975 as document no. B 373,326.

[52] U.S. Cl. .................. 65/60; 65/157; 427/253; 118/49.1; 118/49.5
[51] Int. Cl.² .................................... C03C 17/10
[58] Field of Search ...... 65/60, 157; 118/49.1, 49.5; 117/105, 105.3

[56] References Cited
UNITED STATES PATENTS

| | | | |
|---|---|---|---|
| 2,414,923 | 1/1947 | Batcheller | 427/46 |
| 3,561,940 | 2/1971 | Scholes | 65/60 |

*Primary Examiner*—Arthur D. Kellogg
*Attorney, Agent, or Firm*—Thomas W. O'Rourke

[57] ABSTRACT

This invention pertains to an apparatus and method for treating and coating newly formed glassware surfaces which are moving rapidly on conveyor means through an enclosure in which the glassware is exposed to streams of treatment gas, and particularly metal halide treatment gases, directed towards the glassware from orifices with a substantial component of the direction of travel of the streams of treatment gas being in the direction of travel of the glassware, thereby producing an even coating around the entire periphery of the glassware.

12 Claims, 4 Drawing Figures

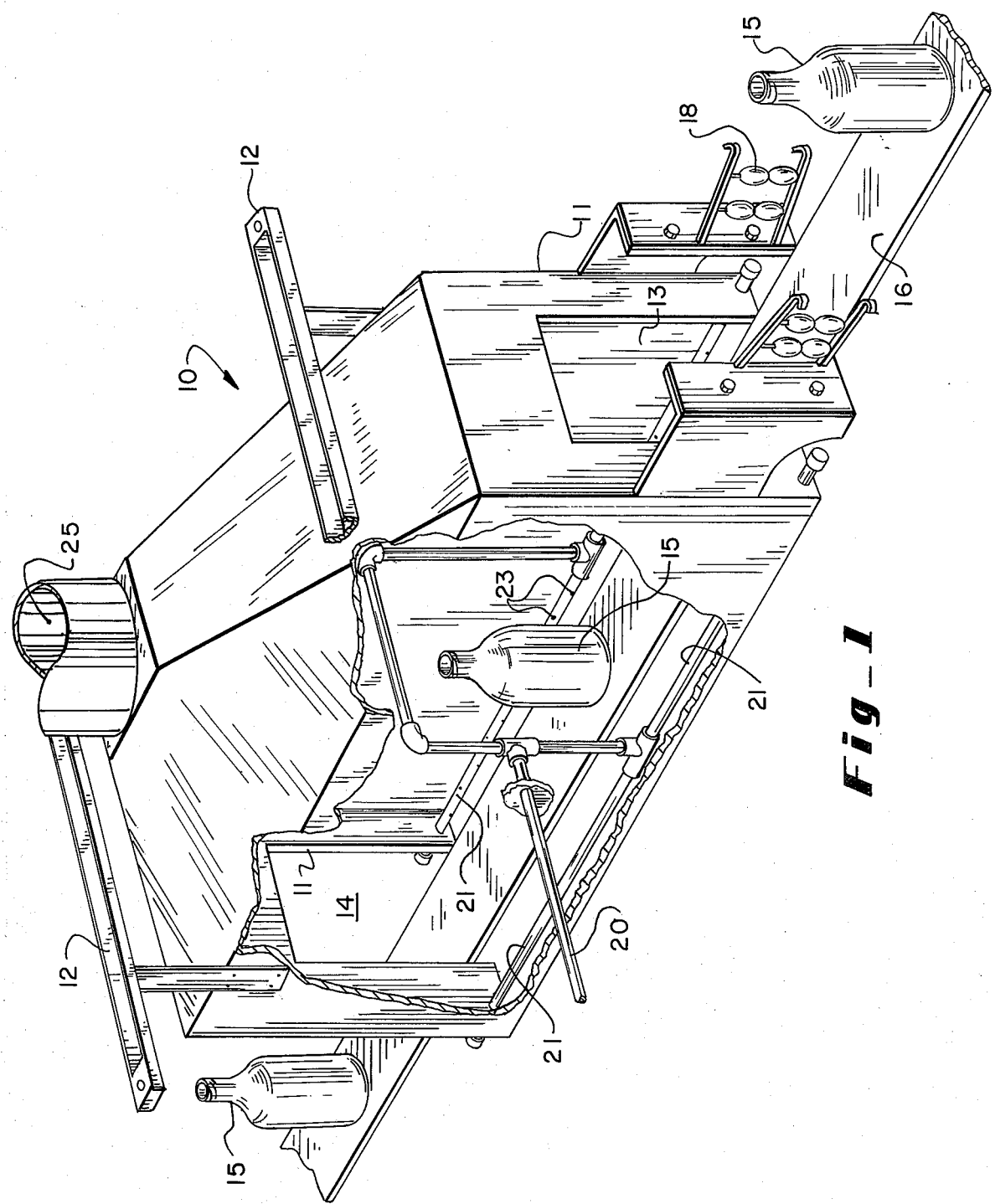
Fig_1

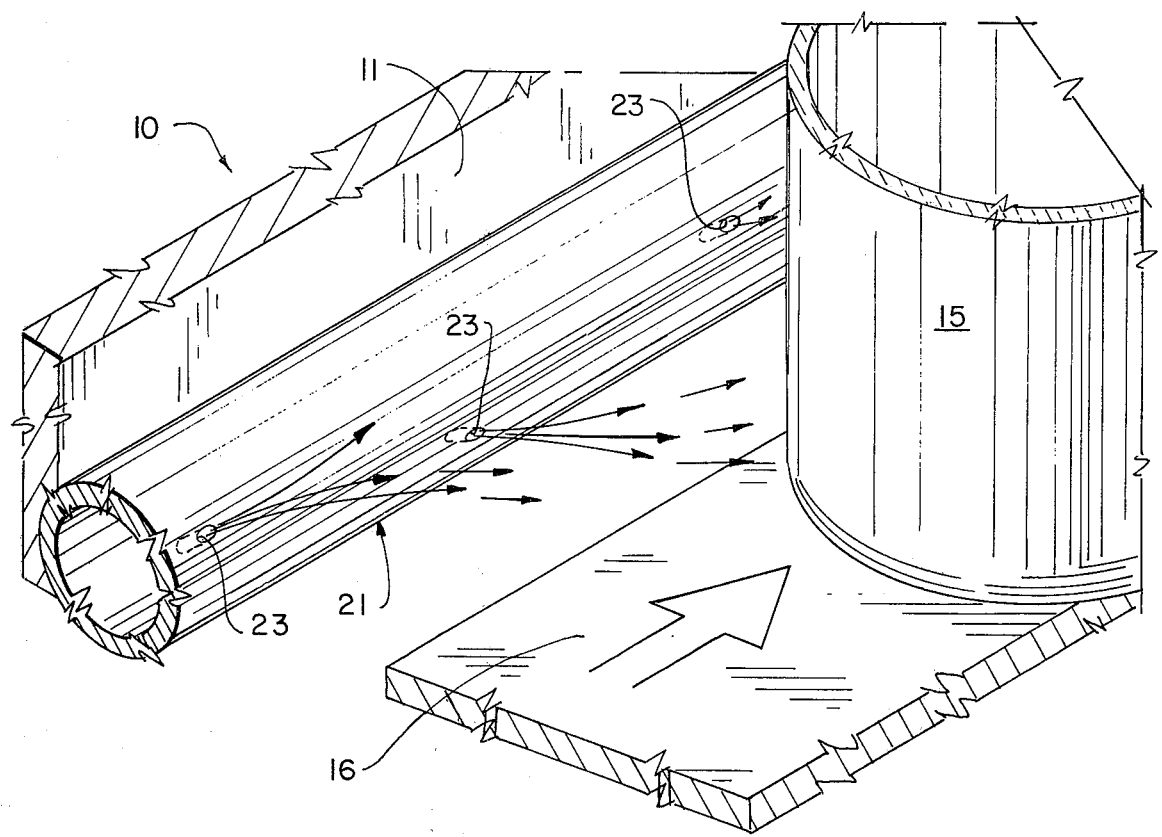
Fig_2
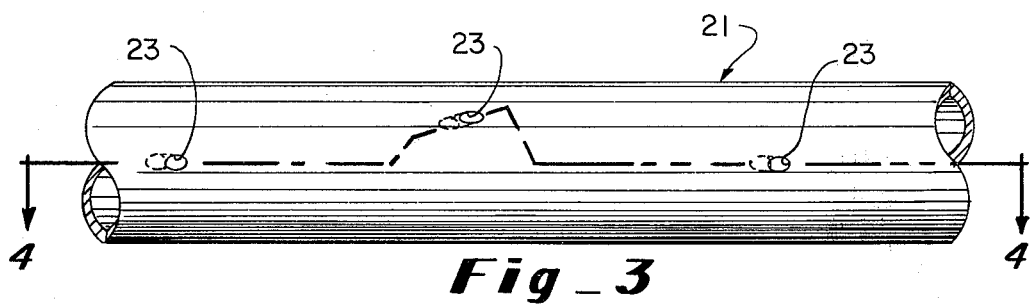
Fig_3
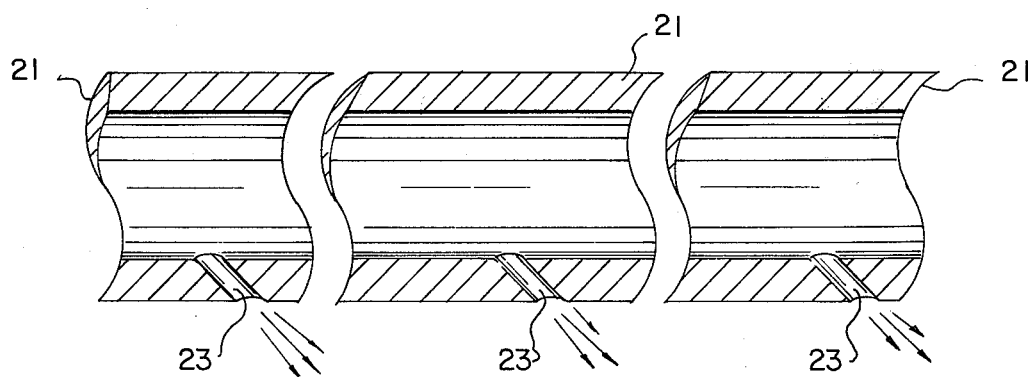
Fig_4

APPARATUS AND METHOD FOR IMPROVED GLASSWARE COATING

BACKGROUND OF THE INVENTION

1. Field of the Invention

The present invention relates generally to glassware coating apparatus and methods, and more particularly to a glassware coating apparatus and method in which glassware is rapidly conveyed through the coating area.

2. Description of the Prior Art

Use of organic compounds of metal halides such as stannous chloride, stannic chloride, titanium tetrachloride, etc., as "hot end" treatment gases are well known and widely accepted in the art of coating glassware. Also, "cold end" treatment vapors and mists of organic material such as polyethylene, polyvinyl alcohol, etc., are widely used. A broad example of apparatus and method to accomplish coating of metal halides on glassware can be found in U.S. Pat. No. 3,561,940, issued Feb. 9. 1971, to Addison B. Scholes. Another example of somewhat different apparatus and method to accomplish coating of glassware with organic compounds is disclosed in U.S. Pat. No. 2,813,045, issued Nov. 12, 1957, to R. B. Abbott, Jr.

In both of these prior art examples, newly formed glassware at temperatures above ambient temperature is exposed to vapors of the treatment gas to form a protective or lubricous coating on the glassware. Since the treatment gases are heavier than air, the previous practice of moving the glassware through the treatment gases resulted in a heavier coating on the leading surface of the glassware and a reduced coating on the trailing surface. Line speeds of several hundred items of glassware per minute require that the glassware be moved rapidly through the treatment volume.

The above examples of the prior art illustrate the prevailing practice of providing the treatment gas in an essentially static condition or with a minor flow perpendicular to the direction of travel of the glassware.

Since the treatment gas is utilized to provide, either singularly or in combination, protective coatings on the glassware to prevent physical or chemical deterioration of the glassware, it has been necessary to coat the portion of the glassware having the thinnest coating with sufficient coating to afford the desired protection. Accordingly, the thickness gradients resulting from the current coating techniques of the prior art have resulted in excess material being applied in areas on the leading portion of the glassware. This is not only wasteful, but may be detrimental to the desired results. For instance, thin coatings on glassware of metal oxide formed from metallic halide treatment gases are entirely sufficient for protection and have low electrical conductivity and little opacity. However, thick coatings of such metal oxides are often electrically conductive and can lead to unwanted electrolytic action between the glassware contents and, for instance, metal closures on the glassware. Also, thick coatings of either "hot end" or "cold end" treatment gases tend to alter the appearance of the glassware and may cause objectionable cloudiness, coloration or iridescence.

SUMMARY OF THE INVENTION

The present invention, which provides a heretofore unrecognized and unavailable improvement over previous methods and apparatus for coating glassware, employs directional streams of treatment gases with substantial components of movement in the direction of travel of the glassware. Accordingly, the average relative movement between the rapidly moving glassware and the treatment gas is minimized, though localized and desirable turbulence may exist. This permits an improvement in the quality and consistency of the coating of glassware.

The modifications necessary to accomplish this end are quite simple. Treatment gas is conventionally provided to an enclosure through orifices in a conduit which carries the treatment gas to the interior of the enclosure. By drilling the orifices with appropriate angles to direct the streams of treatment gas in a direction traveling along with the glassware, the shortcomings of the prior art can be overcome.

Accordingly, an object of the present invention is to provide a new and improved simple method and apparatus for producing an even, homogeneous coating on glassware.

Another object of the present invention is to provide a method and apparatus utilizing essentially conventional coating means which, through critical modification and location of the treatment gas inlet orifices, provides a metallic coating of consistent thickness on glassware.

Yet another object of the present invention is to provide a method and apparatus which may be employed to produce the desired minimal thickness of coating material on glassware without unavoidably overcoating or undercoating of portions of the glassware.

Still another object of the present invention is to provide a method and apparatus which economically utilizes coating material by obviating the need to apply excess coating material to portions of glassware to obtain adequate minimal coatings in other portions.

These and other objects and features of the present invention will be apparent from the following description.

BRIEF DESCRIPTION OF THE DRAWINGS

In the drawings:

FIG. 1 is a partial cutaway view of a coating apparatus of the instant invention;

FIG. 2 is a more detailed view illustrating the novel relationship of the coating apparatus of the instant invention;

FIG. 3 is an enlarged illustration of a treatment gas inlet according to the instant invention; and FIG. 4 is a cross section of the treatment gas inlet shown in FIG. 3.

DETAILED DESCRIPTION OF THE INVENTION

Application of hot end treatment gases to glassware in enclosures is conventionally accomplished at a single line portion of the glassware manufacturing operation. At this point, the glassware is arranged in single file and usually moving at very high line speeds of up to several hundred glassware items per minute. Accordingly, each item of glassware is exposed to the treatment gas in the enclosure for only a short period of time and, as a result, it is a standard practice to maintain rather high concentrations of treatment gas within the enclosure to enhance the kinetics of the operation. With a near saturated atmosphere of vapors of metallic halides such as stannic tetrachloride, it would be expected that the glassware would be rapidly and entirely coated. However, it has now been discovered that the aerodynamic turbulence resulting from movement of the glassware through the treatment volume within the enclosure tends to cause an effective concentration gradient of the treatment gas with the result that treatment gas does not reach the trailing portion of the bottle in amounts comparative to the average concentration of treatment gas. This undesirable effect is compounded even further by the fact that concentrations effectively higher than the average of the treatment volume in general are applied to the leading edge of the glassware.

Since the glassware is coated to provide protection, normal testing does not extend to evenness of coating, but is more a threshold testing to determine the existence of the desired protection. For this reason, coating thickness has been effectively determined by the thinly-coated trailing portion of the glassware. As a result, substantial amounts of coating material have been unnecessarily and undesirably applied to the leading edge of the glassware with, in some cases, undesirable results such as electrical conductivity of the coating, discoloration of the bottle, etc.

To avoid these drawbacks, according to the instant invention, the conduit conducting the treatment gas to the treatment volume inside the enclosure is provided with orifices directed in large part along the direction of travel of the glassware. Thus, the treatment gas is moving relative to the enclosure but largely static relative to the moving glassware. The above-mentioned aerodynamic problem, and the resulting differing effective concentrations, is accordingly avoided since turbulence requires substantial displacement and movement of the treatment gas atmosphere by and relative to the glassware.

The specifics of the apparatus and details of the method will be more readily appreciated with reference to the drawings, wherein like components are designated by like reference numerals throughout the various figures. A coating apparatus for providing a protective coating on glassware is illustrated in FIG. 1 and generally designated by the reference numeral 10. Apparatus 10 generally includes an enclosure 11 supported by hangers 12 and having defined therein an entrance opening 13 and exit opening 14. Glassware 15 is carried on transport means such as conveyor 16 into enclosure 11 through entrance opening 13, and, after passing through the interior of enclosure 11, out of exit opening 14. Guides 18 are optionally provided to position glassware 15 on conveyor 16 for interference-free passage through entrance opening 13 in the direction of travel indicated by the arrows.

Conduit 20 is connected to a source of treatment gas (not shown) and feeds the treatment gas to manifolds 21 positioned, preferably, along both edges of conveyor 16 and, preferably, along substantially the entire length of enclosure 11. Inlet orifices 23 are defined in manifolds 21 with a critical orientation to provide treatment gas to the interior of enclosure 11. Exhaust opening 25 may optionally be provided in enclosure 11, and preferably in the upper portion of enclosure 11 as shown.

The critical orientation of inlet orifices 23 in manifolds 21 is more specifically shown in FIGS. 2, 3 and 4. While the preferred arrangement illustrated is just one embodiment of the innumerable arrangements which will be apparent to those skilled in the art, it will be noted that inlet orifices 23 are defined in manifold 21 in such a manner as to direct fluids issuing from inlet orifices 23 both toward, and along the direction of travel of, conveyor 16. Thus, treatment gas expelled under pressure from inlet orifices 23 moves concurrently with conveyor 16 with little difference between the component of velocity of the treatment gas in the direction of travel of conveyor 16 and the actual velocity of conveyor 16. As a result of this arrangement, there is little relative difference in velocity between treatment gas provided from conduit 20 and glassware 15 carried on conveyor 16.

Of course, inlet orifices 23 can be disposed in single rows, or, preferably, staggered, parallel rows, as illustrated, or in any number of specific arrangements provided the orientation of inlet orifices 23 include a substantial component along the direction of travel of conveyor 16. Nominally, the inlet orifices 23 are directed at a 45° angle to the direction of travel of conveyor 16, but this may be varied from such nominal angle 30° or 35° either towards or away from the direction of travel of conveyor 16 to provide an operable range of 60° to 70°. Such factors as speed of conveyor 16 and velocity of the treatment gas issuing from inlet orifices 23 are taken into account in determining the orientation of inlet orifices 23 for specific applications.

Actual comparison of bottles treated in accord with the instant invention with bottles treated utilizing treatment gas directed perpendicularly to the direction of travel of the conveyor, as is conventional, showed most substantial differences in the nature of coatings. The bottles treated in accord with the instant invention were coated evenly circumferentially. On the other hand, bottles treated conventionally were quite heavily coated on one portion and very lightly coated in the area on the opposite side of the bottle from the portion with heavy coating.

Although specific embodiments of the present invention have been illustrated and described, it is anticipated that various changes and modifications will be apparent to those skilled in the art and that such changes may be made without departing from the scope of the invention, as defined by the following claims.

What is claimed is:

1. Glassware treating apparatus, comprising: an enclosure having entrance and exit openings defined in opposite ends thereof, conveyor means positioned adjacent the lower portion of the enclosure and aligned with both the entrance and exit openings, and treatment gas distribution means located with the enclosure to provide streams of treatment gas within the enclosure, all of such streams being directed partially towards the conveyor directions between about 10° and 80° from the direction of travel of the conveyor belt with a substantial component of velocity of the treatment gas streams being in the direction of travel of the conveyor means, whereby glassware carried through the enclosure on the conveyor means tends to travel with the moving treatment gas rather than through the treatment gas.

2. Glassware treating apparatus as set forth in claim 1, wherein the streams of treatment gas are directed in a direction between 15° and 75° from the direction of travel of the conveyor belt.

3. Glassware treating apparatus as set forth in claim 1, wherein the treatment gas distribution means comprise manifolds disposed along each side of the conveyor means, and a plurality of inlet orifices defined in the manifolds and oriented with both a component towards the conveyor means and a substantial component in the direction of travel of the conveyor means.

4. Glassware treating apparatus as set forth in claim 3, wherein the conveyor means comprise a continuous belt.

5. Glassware treating apparatus as set forth in claim 4, wherein the continuous belt is a foraminous belt.

6. Glassware treating apparatus, comprising: an enclosure with entrance and exit openings defined in opposite ends thereof, a conveyor belt positioned at the lower portion of the enclosure and aligned through both the entrance and exit openings, conduit means communicating both with the exterior and interior of the enclosure for supplying treatment gas to the interior of the enclosure, treatment gas manifolds connected to the conduit means and disposed in the enclosure along opposite sides of the conveyor belt, and inlet orifices defined in the manifolds and all oriented with a substantial component in the direction of travel of the conveyor belt and with a component in the direction of the glassware.

7. Glassware treating apparatus as set forth in claim 6, wherein the inlet orifices are arranged in a plurality of horizontal rows along the manifolds of the side of the manifold facing the conveyor belt, whereby treatment gas directed through such inlet orifices is propelled both towards and along the conveyor means at differing heights above the conveyor means substantially corresponding to the height of the glassware being treated.

8. A method of treating glassware with a treatment gas, comprising: rapidly conveying a series of glassware articles to an enclosure, forming a mixture of treatment gas in a lighter carrier gas, conducting the mixture of treatment gas to at least one manifold located in the interior enclosure, expelling the treatment gas mixture under pressure through at least one inlet orifice defined in the manifold to form a substantially coherent, moving stream of treatment gas mixture, and directing all streams of treatment gas mixture into the enclosure in a direction at least partially in the direction in which the glassware articles are conveyed and at least partially towards the glassware, whereby the relative velocity between the articles being treated and the treatment gas is substantially less than the difference in the relative velocity of the glassware articles and the enclosure.

9. A method of treating glassware as set forth in claim 7, wherein the treatment gas is a metallic halide.

10. A method of treating glassware as set forth in claim 9, wherein the treatment gas is stannic chloride and the carrier gas is air.

11. A method of treating glassware as set forth in claim 8, wherein a plurality of streams of treatment gas are formed and all directed towards the glassware and along the direction of travel of the glassware from each side of the enclosure.

12. A method of treating glassware with a treatment gas dispersed in a carrier gas, comprising: conveying glassware through an enclosure and directing all streams of treatment gas and carrier gas both towards the glassware and with a substantial component of movement of the treatment gas in the direction in which the glassware is conveyed.

* * * * *

UNITED STATES PATENT OFFICE
CERTIFICATE OF CORRECTION

PATENT NO. : 3,920,433
DATED : November 18, 1975
INVENTOR(S) : Clement V. Fogelberg and John M. Kujava It is certified that error appears in the above-identified patent and that said Letters Patent are hereby corrected as shown below:

Inventor listed as "John M. Kujave" should read --John M. Kujava--.

Signed and Sealed this second Day of March 1976

[SEAL]

Attest:

RUTH C. MASON
Attesting Officer

C. MARSHALL DANN
Commissioner of Patents and Trademarks